United States Patent [19]

Toyen

[11] 3,786,440

[45] Jan. 15, 1974

[54] DIGITAL DATA STORAGE WITH EQUAL INPUT AND OUTPUT DATA RATE, BUT VARIABLE MEMORY SHIFT RATE

[75] Inventor: Gerald L. Toyen, San Diego, Calif.

[73] Assignee: General Dynamics Corp., San Diego, Calif.

[22] Filed: Jan. 26, 1973

[21] Appl. No.: 326,733

[52] U.S. Cl. ........ 340/173 R, 307/221 R, 340/172.5

[51] Int. Cl. ........ G11c 19/00

[58] Field of Search ........ 340/173 R, 172.5; 307/221 R

[56] References Cited

UNITED STATES PATENTS

| | | | |
|---|---|---|---|
| 3,292,156 | 12/1966 | Stochel | 340/172.5 |
| 3,521,245 | 7/1970 | Rogers | 340/173 R |

*Primary Examiner*—Bernard Konick
*Assistant Examiner*—Stuart Hecker
*Attorney*—Martin LuKacher

[57] ABSTRACT

The storage capacity or length of a memory consisting of shift registers which may only be available in certain discrete bit lengths is controlled or programmed by shifting data from each stage of an input serial to parallel shift register into different ones of the memory shift registers and then transferring the data from the output stages of the memory registers into an output parallel to serial shift register. The ratio, between the number of clock pulses which shift the data into and out of the input and output registers and number of clock pulses which shift the data in the memory registers, is changed so as to alter the fan out of data from the input shift register into the memory registers. The storage capacity or length of the memory can be changed or programmed during storage operations so as to have any length up to and including the storage capacity of all of the memory registers and any additional buffer registers which may be associated therewith.

18 Claims, 3 Drawing Figures

DIGITAL DATA STORAGE WITH EQUAL INPUT AND OUTPUT DATA RATE, BUT VARIABLE MEMORY SHIFT RATE

The present invention relates to methods and systems for digital data storage and particularly to methods and systems for storing digital data in shift registers.

The invention is especially suitable for use in memories which use shift registers which have discrete bit lengths such as micro-circuit shift registers using metal oxide semiconductors (MOS) or other integrated circuitry and makes memories using such registers applicable to systems requiring specified memory capacity or length. The invention however is generally applicable to digital data storage particularly where the capacity of the store or memory is subject to change during data processing operations.

Various types of shift register memories have been suggested in the memories proposed in U.S. Pat. Nos. 3,051,929; 3,362,014 and 3,292,156. Data is buffered in the registers by being supplied to the input at one rate and from the output at another rate. Such buffering techniques do not effectively vary register size. The same total number of bits is always stored in the register. Other attempts at varying word storage length which have been proposed are to gate or to switch the stages of the shift registers (see for example U.S. Pat. No. 3,230,514). Where the stages of the register are not available externally of the device, as in integrated circuit devices, switching and gating techniques are not feasible. Still other approaches have been to recirculate data through the memory so as to provide increased lengths which can be shortened (see U.S. Pat. Nos. 3,605,024 and 3,564,429). The latter techniques involve complex programming logic and sacrifice memory speed.

Accordingly, it is an object of the present invention to provide an improved method of and system for storage of digital data.

It is another object of the present invention to provide an improved method and system for shift register storage of digital data.

It is a still further object of the present invention to provide an improved method of and system for changing the data storage capacity of a memory.

It is a still further object of the invention to provide an improved method of and system for changing the capacity or length of shift register memories.

It is a still further object of the present invention to provide an improved method of and system for operating a shift register memory so as to vary the length of series of data bits stored therein.

It is a still further object of the present invention to provide an improved system and method for changing the length, in terms of the number of bits, during operation of a memory without altering internal connections between memory stages.

It is a still further object of the present invention to provide an improved method and system for programmably changing the length of the memory which is made up of fixed length shift registers, as are available in the form of integrated circuit devices which do not have facilities for adding to or subtracting from the number of register stages therein.

It is a still further object of the present invention to provide an improved method and system for storage of data in a register at a rate greater than the rate which the register itself can accept data for storage.

Briefly described, the invention is embodied in the method and system of storing digital data in a plurality of storage devices such as shift registers, each of which has storage for a plurality of data bits in series. The data is presented for storage through the input stages of the registers in sequence. The data is advanced through the registers at a predetermined rate but less than the rate at which the data is sequentially presented to the input stages of the registers. The effect of presentation of data at one rate and advancing data at another rate is that the fan out of the data in the registers is controlled in accordance with the ratio of the rates. By changing the ratio, the capacity or length of the memory which is constituted by the registers may be changed. Such change can be effected by programming at computing speeds in order to derive the ouptut data or read out the memory. The bits are derived from the output stages of the register to obtain a series of bits which are advanced at the same rate in which they are presented to the input stage of the register. Output and input data is therefore entered and derived from the register at high computing speeds and the length of the register which may be constituted of fixed length devices such as integrated circuit shift registers, is adapted to be changed or programmed as desired.

The foregoing and other objects and advantages and features of the present invention will become more readily apparent from a reading of the following specification in connection with the accompanying drawings in which.

Figure 1:
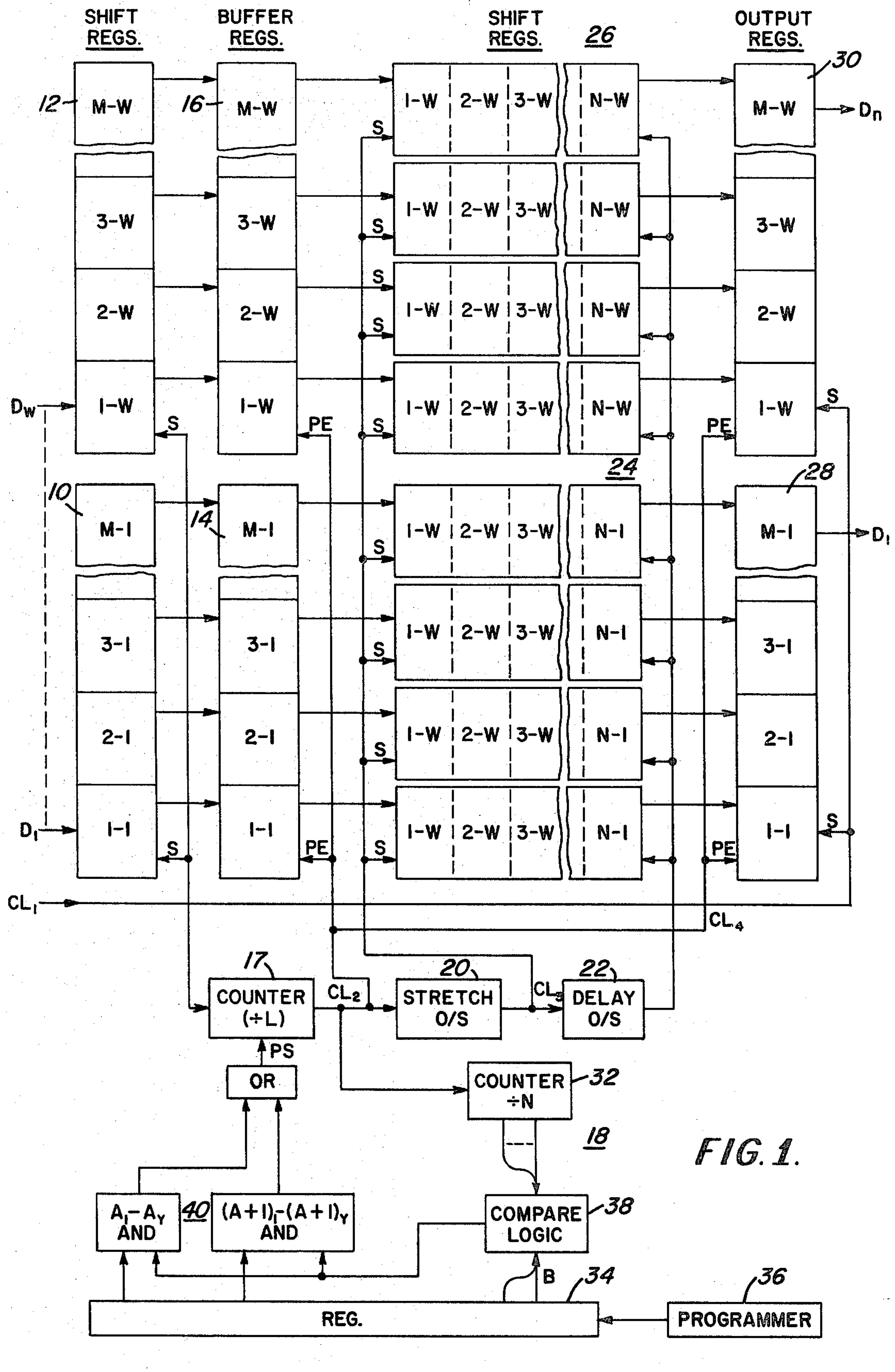
FIG. 1 is a schematic diagram illustrating in block form a memory system embodying the invention.

A work organized memory is shown in FIG. 1. Input data words, each consisting of W bits $D_1$ to $D_W$ are presented to the first stage of W M bit shift registers. The first of the M bit shift registers 10 and the last or Wth of these registers 12 is illustrated in FIG. 1. The first data bit $D_1$ is presented to the first stage 1-1 of the register 10 and the last data bit $D_W$ is presented to the first stage 1-W of the shift register 12. The other of the W shift registers are not shown in FIG. 1 to simplify the illustration.

The shift registers 10 to 12 serve as input, series to parallel shift registers. The bits which are entered into the input or first stages of these registers 1-1 to 1-W are shifted to the later or higher order stages by clock pulses $CL_1$ which are applied to the shift inputs of the registers 10 to 12. The clock pulses $CL_1$ accompany each input data word, $D_1$ to $D_W$, and have a frequency or repetition rate equal to the rate at which the words are presented to the registers 10 and 12. It will be observed therefore that each register 10 to 12 and each of the registers of the system which is connected thereto handles one bit of the parallel $D_1$ to $D_W$ word. Accordingly, only the portion of the system which handles the first bit $D_1$ will be discussed in detail as the description proceeds.

Each stage of the input series to parallel shift registers 10 to 12 is connected to a corresponding stage of a buffer register 14. The buffer register 14 handles the first bit $D_1$ and the buffer register 16 handles the last bit $D_W$ of the input word. The input clock pulses $CL_1$ are divided by a predetermined number L in a counter 17 which may be preset to select the number of clock pulses $CL_1$ which must be counted before the counter 17 recycles. Upon reaching the count of L the counter 17 supplies an output clock pulse $CL_2$. The counter 17 is part of the control logic 18 of the memory system which will be discussed in greater detail hereinafter.

The buffer registers 14 and 16 accept the data from the input registers 10 to 12 upon each $CL_2$ clock pulse supplied by the counter 17, which are applied to the preset enable (PE) inputs of the buffer registers 14 to 16. The parallel buffer registers 14 to 16 are used so as to handle a high bit rate. These buffer registers may be omitted if the input words are supplied at rates which the devices associated with the memory have the capability of handling.

Figure 2:
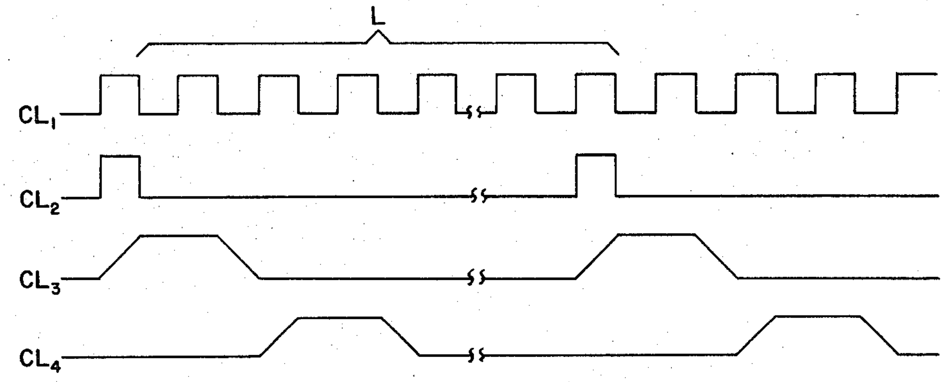
FIG. 2, is a series of waveforms which illustrates the operation of the memory system shown in FIG. 1.
Figure 3:
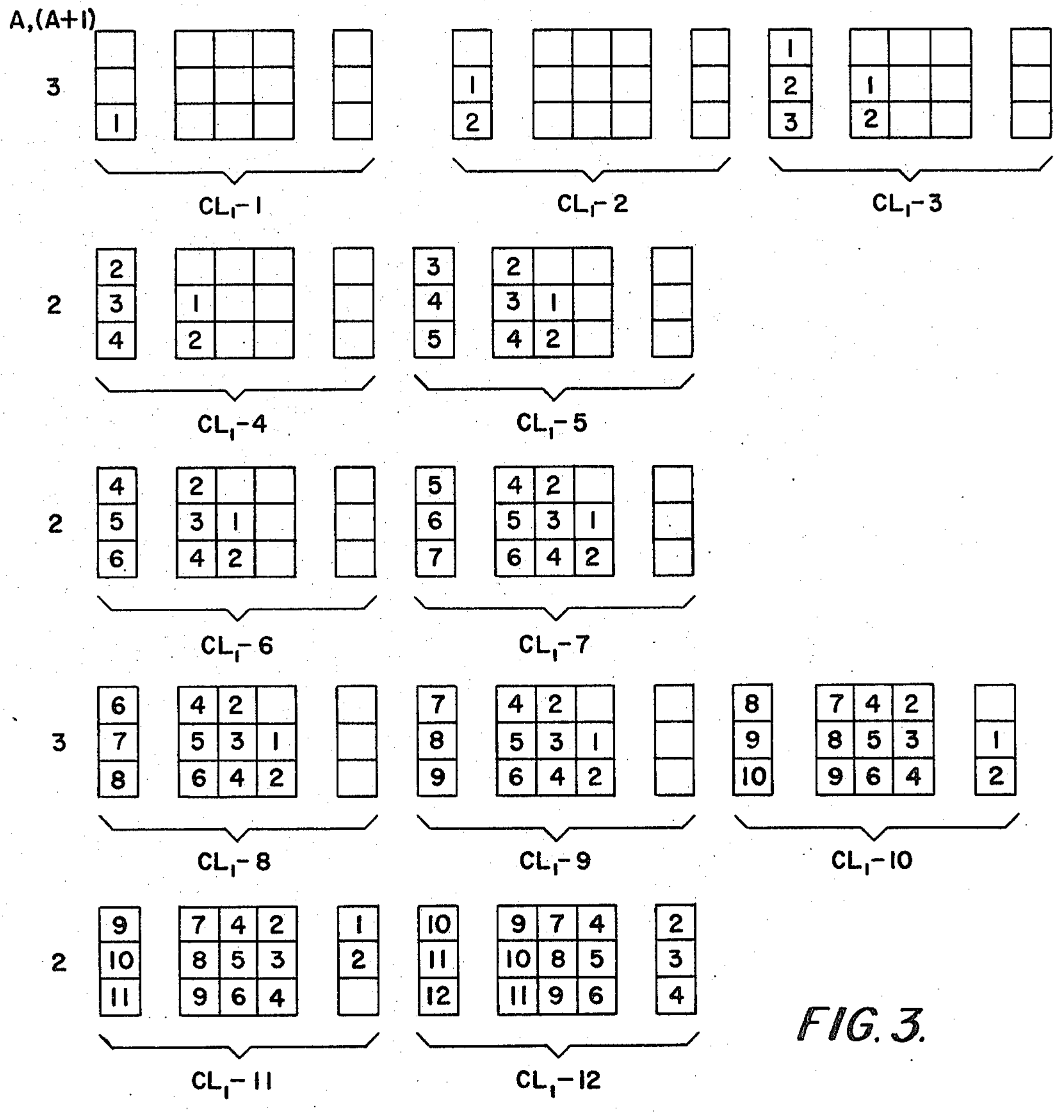
FIG. 3 is a diagrammatic presentation in simplified form of the method and system of changing or programming the capacity or length of the memory in accordance with the invention.

The clock pulses $CL_2$ are altered in waveform but not in repetition rate by a stretching circuit 20 which may be a one-shot multivibrator which triggers on the leading edge of the $CL_2$ clock pulse (see FIG. 2), and a delay circuit 22 which may be another one-shot multivibrator which triggers on the trailing edge of the output pulse from the stretching circuit 20. The stretching circuit output pulse is indicated as the clock pulse $CL_3$ and the delay circuit output pulse is indicated as clock pulse $CL_4$. The wave shape of the various clock pulses and their timing is shown in FIG. 2.

A matrix of shift registers provides the principal storage for data in the memory.

A group 24 of such registers is provided for each bit of the word, the group 24 being provided for bit $D_1$ and the group 26 for the bit $D_W$. There is a separate shift register in each group for each of the M stages of the input and buffer registers. There are therefore M shift registers, each shift register has storage for N data bits in series. The inputs or first stage of the register 24 are indicated as 1-1 and the inputs or first stage of the register 26 are indicated as 1-W. The last or output stage of the registers for the first data bit are indicated as N-1 and for the last data bit as N-W. The registers may be integrated circuit registers such as MOS shift registers. Such registers are available with fixed bit lengths, say 50, 100, 200, 256 bits. There is no access to the internal integrated circuits of the registers for gating or switching out any stages. The invention provides a memory system of capacity or length of any length less than the maximum length (NM) in the registers 24 to 26, which length may be changed or programmed as desired. Inasmuch as the input series to parallel registers 10 to 12 and the output registers 28 to 30 also provide storage, the total memory length has in addition M+1 bits.

The data in the buffer registers is transferred to the shift registers 24 to 26 by the trailing edge of the $CL_3$ clock pulses which are applied to the shift inputs thereof and are advanced through the registers 24 to 26 by the $CL_3$ and $CL_4$ pulses.

The data is shifted from the Nth stage of the registers 24 to 26 to output parallel to serial registers 28 to 30 on occurrence of the trailing edge of the $CL_2$ clock pulses from the counter 17 which are applied to the preset enable (PE) inputs of the registers 28 to 30. The registers 28 to 30 each have M stages, one for each of the registers in the register groups 24 to 26. Data is shifted between consecutive register stages by the $CL_1$ clock pulses which are applied to the shift inputs thereof. The bits of the word $D_1$ to $D_W$ which are stored in the memory are read out of the last M-1 to M-W stages of the output registers 28 to 30 at the $CL_1$ clock rate.

Returning now to the control logic 18, a counter 32 which counts up to N (which is the number of stages in each of the shift registers in the register group 24 to 26), counts $CL_2$ clock pulses. When N such pulses are counted, the counter 32 recycles. A register 34 has entered therein certain data words which are indicated as being the data words $A_1$, $(A+1)_1$ to $A_y$, $(A+1)_y$, and B by a programmer 36 which may be a keyboard, other input device, or the output device of a computer system with which the memory is associated. The numbers, all of the A's, and (A+1)'s, and B are binary or other digitally coded numbers which are stored in the register 34. The programmer selects these numbers in accordance with the memory capacity or length which is desired. B is a predetermined control coefficient which is equal or greater than zero and equal or less than N which is the total number of stages in the registers of the groups 24 to 26. The A numbers are dictated by the value of the B numbers such that A is always equal to the difference between N and B.

The data word corresponding to the B number is presented to compare logic 38 with the numbers stored in the counter 32. When the number in the counter 32 equals B, an enable level is applied to logic gages 40 which transfer the numbers set in the register to the preset (PS) input of the counter 17. Thus the programmed (A+1) number will be transferred to the counter 17 for presetting the counter to recycle (L equals whatever A+1 number from $(A+1)_1$ to $(A+1)_y$ is programmed into the register 34), when the numer of $CL_2$ pulses counted by the counter 32 is less than or equal to B. However, when the number in the counter exceeds B and until the counter recycles at a count of N $CL_2$ pulses, the AND gate which passes the $A_1$ through $A_y$ numbers is enabled and the counter 17 is preset to the selected $A_1$ to $A_y$ number. In other words the control logic operates to provide predetermined numbers of $CL_2$ pulses for each memory cycle which is determined by the number of stages, N, in the shift registers of the shift register groups 24 to 26. There will be during each cycle or each sequence of N $CL_2$ pulses, a predetermined number, A+1, of $CL_1$ pulses, for each $CL_2$ pulse, followed by a predetermined number, A, of the $CL_1$ pulses for each $CL_2$ pulse, until the total number of $CL_2$ pulses reaches N thereof. The magnitude of the number A of $CL_1$ pulses which can occur before a $CL_2$ pulse, is determined by the speed limitation of the shift registers in the groups of shift registers. A should therefore be, at a minimum, greater than 1 (the integer 1) and less than M−1 where M is the number of shift registers in each group 24 to 26 of shift registers. By selecting the values of A and B, the fan out of the data throughout the M shift registers in each group 24 and 26 is varied from the minimum fan out to the total available fan out (viz., M, which is equal to the number of shift registers in each group). The total or bit length for the word organized memory is therefore a function of A, N, B, and M for each bit of the data word and may be expressed as follows:

$T = A\ N + B + M + 1$; T being the total number of bits or bit length in each of the registers associated with each bit of the data word. On a word organized basis the total capacity of the memory is equal to $T_W = W(AN+B+M+1)$ where $T_W$ is the total number of bits stored in the memory.

Consider, solely for purposes of illustration, a memory system for storing a single typical bit which contains input and output registers having storage for three bits ($M$=3) and a group of shift registers having a length of three bits (viz., storing three bits in series so that N equals 3). The sequence of A, A+1 to be considered will be 2 and 3. The number B in the example is 1. Accordingly, the counter 17 will first be preset to count A+1 or three $CL_1$ pulses. Since the length of the registers is 3, N=3, for the next two and then for the following two $CL_1$ pulses, the counter 17 will be preset to divide by 2, the cycle will then repeat itself for three, two and two $CL_1$ pulses until the programming is changed.

Consider that the first $CL_1$ pulse will enter the first data bit in the first stage of the input serial to parallel register. Inasmuch as a $CL_2$ pulse does not occur until the third $CL_1$ pulse, the data will not be loaded from the input register into the first stage of the N bit registers until the third $CL_1$ pulse. Again, not until the fifth $CL_1$ pulse is the next $CL_2$ produced so as to load the contents of the input register into the first stages of the N bit registers and advance the pulses in the first stage to the second stage thereof. Parallel loading of the registers override or writes over the data previously stored therein. It will be observed therefore that not until the tenth $CL_1$ pulse is the data shifted from the Nth stages of the N stage registers to the output parallel to the serial register. Finally on the 12th $CL_1$ pulse, the first bit is read out of the last or Mth stage of the output register. It will be observed therefore that the fan out in the register is a function of the value A and any number up to the maximum total number of stages in the registers can constitute the length of the memory.

From the foregoing description it will be apparent that there has been provided an improved method of and system for storage of digital data, particularly with the aid of shift registers. While a specific embodiment of a system incorporating the invention has been described, for purposes of illustrating the invention, it will be appreciated that variations and modifications therein within the scope of the invention as well as of the methods of data storage described in connection with the illustrated memory, will become apparent to those skilled in the art. Accordingly, the foregoing description should be taken merely as illustrative and not in any limiting sense.

What is claimed is:

1. The method of storing digital data which comprises a. sequentially presenting a plurality of different bits of a series of bits for storage at the inputs of a plurality of storage devices each of which has storage for a plurality of bits in series;

b. advancing said bits stored in said devices sequentially in each of said devices at a predetermined rate less than the rate of sequential presentation;

c. deriving a series of bits each from the output of a different one of said devices; and d. advancing said derived series of bits in the order in which derived and at said rate of sequential presentation.

2. The invention as set forth in claim 1 including the step of alternately advancing said bits at a second predetermined rate and at said first named predetermined rate.

3. The invention as set forth in claim 2 wherein said step of advancing at said first and second rates are carried on for first predetermined number of times at said first rate and a second number of predetermined times at said second rate where said second number of predetermined times equals the difference between the number of said plurality of bits in series for which each of said devices has storage and said first predetermined number of times.

4. The invention as set forth in claim 3 including the step of changing said first and second predetermined numbers while said bits are presented to the inputs of said devices for storage.

5. The invention as set forth in claim 1 including the step of successively presenting each of the bits which constitute said plurality to the input of another device having storage of said first named series of bits, and successively advancing each of said presented bits in said other device at said rate of sequential presentation.

6. The invention as set forth in claim 5 including the step of presenting words consisting of a plurality of bits in parallel, each to the input of a separate one of said other devices for providing a plurality of said first named series of bits, sequentially presenting in parallel each of said plurality of said first named series of bits to the inputs of said plurality of said storage devices which corresponds to different ones of said plurality of first named series of bits, advancing said bits stored in each of said devices at said predetermined rate, deriving separate series of bits from the outputs of each of said different groups of devices, and advancing each of said derived series of bits in the order in which derived and at said rate of presentation to read out said words.

7. A system for storing digital data which comprises first means for storing a plurality of consecutive bits of said data in series, a plurality of means each for storing a plurality of bits in series, means for entering at a first rate, different ones of said bits from said first storage means into the input of different ones of said second storage means, means for advancing said bits in each of said plurality of storing means from the input to the output thereof at said first rate, means for advancing said bits, said first storing means at a second rate greater than said first rate, second means for storing a plurality of consecutive bits in series, means for entering bits from the outputs of different ones of said plurality of storing means in series in said second storing means, and means for reading out said bits stored in said second storing means consecutively at said second rate.

8. The invention as set forth in claim 7 including means for changing said first rate.

9. The invention as set forth in claim 8 wherein said rate changing means includes means operative to alternately change said first rate after first and second predetermined numbers of bits are entered into said plurality of storing means.

10. The invention as set forth in claim 9 wherein said plurality of storing means each has storage for N bits and wherein said changing means includes means for changing said rate after B and again after N-B bits are entered into said plurality of storing means.

11. The invention as set forth in claim 7 wherein said first storing means is a shift register having M stages each for a separate one of said plurality of consecutive bits, means for said bits into the first of said M stages, and means for advancing said bits from between successive ones of said M stages at said second rate.

12. The invention as set forth in claim 11 wherein each of said plurality of storing means is a separate shift register having storage for N bits, different ones of said M stages being connected to the first or input stage of different ones of said plurality of registers.

13. The invention as set forth in claim 12 including an M stage buffer register connected between said first storing means and said input stages of said plurality of N stage storing means shift registers, and means for transferring the bits in said M stage first register into said M stage buffer register and then from said M stage buffer register to said N stage register inputs at said first rate.

14. The invention as set forth in claim 12 including an M stage output shift register, each stage of which being connected to Nth or output stage of different ones of said plurality of N stage shift register, means for entering the bits stored in said output stages into different ones of the stages of said output register at said first rate, and means for advancing said bits consecutively between the stages of said output register at said second rate, read out from said system being provided at the Mth stage of said output register.

15. The invention as set forth in claim 14 wherein said means for advancing said bits at said first rate includes means for counting clock pulses at said second rate to provide clock pulses at said first rate and means for applying said clock pulses as shift pulses to each of said plurality of N stage shift registers.

16. The invention as set forth in claim 15 including means for changing said first rate including means for presetting said counter after said counter counts a predetermined number of said second rate clock pulses for a predetermined number of successive first clock pulses at said changed first rate.

17. The invention as set forth in claim 16 wherein said presetting means includes a second counter which counts N clock pulses and then recycles, means responsive to the count stored in said second counter when said count reaches B, a number less than N, for providing a control signal until said second counter reaches a count of N, and means for presetting said first counter to provide said each of second clock pulses after a number L which is equal or less than M of said first clock pulses when said control signal is present and to provide each of said second clock pulses after a number less than L of said first clock pulses when said control signal is absent.

18. The invention as set forth in claim 17 wherein said system is organized to provide storage for words of said digital data and includes a plurality of said M stage first storing means registers each for a separate bit of said words, a plurality of groups of said N stage shift registers each corresponding to a different one of said M stage first storing means registers, the input stages of said N stage register being connected to different ones of the M stages of the M stage first storing means register corresponding thereto, and a plurality of M stage output registers each corresponding to a different one of the groups of N stage shift registers, the output stages of each group of N stage shift registers each being connected to a different stage of the M stage output shift register corresponding thereto, said second rate clock pulses being applied to all said M stage first storing means and output registers and said first rate clock pulses being applied to all of said N stage shift registers.

* * * * *